United States Patent Office 3,590,086
Patented June 29, 1971

3,590,086
HALOGENATED 1,4,5,8-DIMETHANONAPHTHA-
LENE-2,2-DIMETHANOLS
Jerome A. Gourse, Chicago, Ill., assignor to Velsicol
Chemical Corporation, Chicago, Ill.
No Drawing. Filed Oct. 14, 1968, Ser. No. 767,490
Int. Cl. C07c 35/22
U.S. Cl. 260—617                                  7 Claims

ABSTRACT OF THE DISCLOSURE

This invention discloses new chemical compositions of matter and more particularly new compounds of the general formula

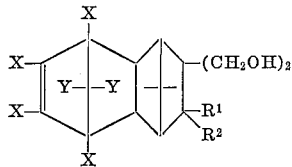

wherein X is selected from the group consisting of chlorine, fluorine and bromine; Y is selected from the group consisting of hydrogen, chlorine, fluorine and bromine; and $R^1$ and $R^2$ are selected from the group consisting of hydrogen and alkyl. These compounds are useful as intermediates for the preparation of a variety of synthetic resins and plastics exhibiting flame and fire retardant properties.

---

This invention relates to new chemical compositions of matter and more particularly to new compounds of the general formula

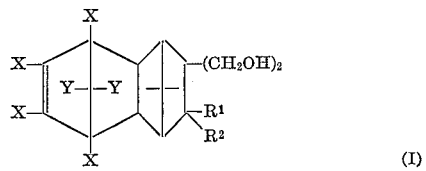

wherein X is selected from the group consisting of chlorine, fluorine and bromine; Y is selected from the group consisting of hydrogen, chlorine, fluorine and bromine; and $R^1$ and $R^2$ are selected from the group consisting of hydrogen and alkyl.

In a preferred embodiment of this invention $R^1$ and $R^2$ are selected from the group consisting of hydrogen and alkyl having up to six carbon atoms.

The compounds of the present invention are useful for preparing a variety of synthetic resins and plastics and particularly for preparing saturated and unsaturated polyesters. When used for preparing polymeric compositions the compounds impart valuable flame and fire retardant properties to these compositions and articles manufactured therefrom.

The compounds of this invention can be prepared readily from a di-(hydroxymethyl)norbornene of the formula

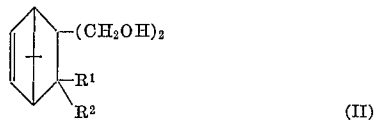

wherein $R^1$ and $R^2$ are as heretofore described, by adduction with a polyhalocyclopentadiene of the formula

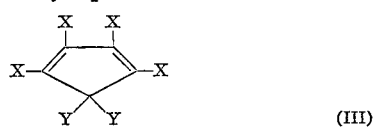

wherein X and Y are as heretofore described. This reaction can be readily effected by refluxing the reactants in an inert organic reaction medium, such as benzene, toluene, xylene and the like, for a period of from about 8 to about 48 hours. The desired product usually forms as a precipitate and can be readily recovered by filtration of the reaction mixture. This product can be used as such or can be further purified by crystallization or other common techniques in the art.

Exemplary suitable polyhalocyclopentadienes are hexachlorocyclopentadiene, hexabromocyclopentadiene, hexafluorocyclopentadiene, pentachlorocyclopentadiene, pentabromocyclopentadiene, tetrachlorocyclopentadiene, and the like.

The glycols of Formula II can be prepared by reacting formaldehyde with a Diels-Alder adduct of cyclopentadiene and an α,β-unsaturated aldehyde of the formula

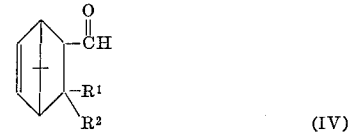

wherein $R^1$ and $R^2$ are as heretofore described, in the presence of one of more alkaline condensing agents.

Exemplary suitable condensing agents are alkali metal and alkaline earth metal hydroxides such as sodium hydroxide, potassium hydroxide, calcium hydroxide, strontium hydroxide and barium hydroxide; alkali metal carbonates such as sodium carbonate and potassium carbonate; and alkaline earth metal oxides such as calcium oxide and the like.

Formaldehyde can be used in the form of an aqueous solution, the 30% to 40% solutions of commerce being particularly suitable, or can be supplied from a polymer such as paraformaldehyde.

A convenient manner in which to effect this reaction is by charging the reactants into a suitable reaction vessel and adding the condensing agent at a rate that will maintain the reaction temperature at a desired level. Suitable reaction temperatures are from about room temperature to the reflux temperature of the reaction mixture, but a preferred temperature range is from about 40 to about 70° C. After completion of the reaction the desired product which forms as a precipitate can be recovered by filtration and can be used as such or can be purified by washing, recrystallization, distillation or other common procedures.

The 5-norbornene-2-carboxaldehyde of Formula IV can be readily prepared by the well known Diels-Alder adduction of cyclopentadiene and an α,β-unsaturated aldehyde. Suitable aldehydes are acrolein, crotonaldehyde, 2-pentenal, 2-hexenal, 2-heptenal, 2-decenal, and the like.

The manner in which the compounds of the present invention can be prepared readily is illustrated in the following examples.

EXAMPLE 1

Preparation of 5-norbornene-2-carboxaldehyde

Acrolein (266 ml.; 4 mol) was charged into a glass reaction vessel equipped with a mechanical stirrer, thermometer, reflux condenser and addition funnel and cyclopentadiene (328 ml.) was slowly added over a period of about 1½ hours. The temperature of the reaction mixture was maintained between about 25 and 30° C. After the addition was completed the mixture was stirred at room temperature overnight. After this time the mixture was heated, with stirring, at a temperature of about 45° C. for an additional period of about 5 hours. The reaction mixture was then distilled under aspirator pressure to yield the desired product 5-norbornene-2-carboxaldehyde.

EXAMPLE 2

Preparation of 5-norbornene-2,2-dimethanol 5-norbornene-2-carboxaldehyde (50 grams; 0.41 mol) and an aqueous solution of formaldehyde (100 grams; 36% by weight; 1.2 mol) were charged into a glass reaction vessel equipped with a mechanical stirrer, thermometer, reflux condenser and addition funnel. The reaction mixture was stirred and potassium hydroxide (79 grams) dissolved in absolute ethanol (150 ml.) was added thereto at such a rate as to maintain the temperature of the mixture between about 50 and 60° C. Upon completion of the addition stirring was continued until the exotherm subsided and thereafter was heated on a steam bath for a period of about 3½ hours. After this time the reaction mixture was distilled leaving a solid product. The solid was recrystallized from benzene to yield 5-norbornene-2,2-dimethanol as white crystals having a melting point of 107 to 111° C.

EXAMPLE 3

Preparation of 5,6,7,8,9,9-hexachloro-1,2,3,4,4a,5,8,8a-octahydro-1,4,5,8-dimethanonaphthalene-2,2-dimethanol 5-norbornene-2,2-dimethanol (34.8 grams), hexachlorocyclopentadiene (60.8 grams) and toluene (150 ml.) were charged into a glass reaction vessel equipped with stirrer, thermometer and reflux condenser. The reaction mixture was heated at reflux for a period of about 48 hours resulting in the formation of a solid precipitate. The precipitate was recovered by filtration to yield the desired product 5,6,7,8,9,9 - hexachloro - 1,2,3,4,4a,5,8,8a-octahydro-1,4,5,8-dimethanonaphthalene-2,2-dimethanol having the following elemental analysis as calculated for $C_{14}H_{14}Cl_6O_2$:

Theoretical percent: C, 39.36; H, 3.31; Cl, 49.83. Found percent: C, 39.94; H, 3.43; Cl, 47.91.

EXAMPLE 4

Preparation of 5,6,7,8,9,9-hexabromo-1,2,3,4,4a,5,8,8a-octahydro-1,4,5,8-dimethanonaphthalene-2,2-dimethanol 5-norbornene-2,2-dimethanol (30.8 grams; 0.02 mol), hexabromocyclopentadiene (10.8 grams; 0.02 mol) and toluene (150 ml.) are charged into a glass reaction vessel equipped with stirrer, thermometer and reflux condenser. The reaction mixture is heated at reflux for a period of about 24 hours resulting in the formation of a solid precipitate. The precipitate is recovered by filtration and is recrystallized to yield the desired product 5,6,7,8,9,9-hexabromo - 1,2,3,4,4a,5,8,8a-octahydro-1,4,5,8-dimethanonaphthalene-2,2-dimethanol.

EXAMPLE 5

Preparation of 3-methyl-5-norbornene-2-carboxaldehyde

Crotonaldehyde (140 grams; 2 mol) is charged into a glass reaction flask equipped with a mechanical stirrer, thermometer and addition funnel, and cyclopentadiene (132 grams; 2 mol) is slowly added over a period of about 1 hour. The temperature of the reaction mixture is maintained at about 40° C. for a period of about 4 hours. After this time the reaction mixture is distilled under aspirator pressure to yield the desired product 3-methyl-5-norbornene-2-carboxaldehyde.

EXAMPLE 6

Preparation of 3-methyl-5-norbornene-2,2-dimethanol 3-methyl-5-norbornene-2-carboxaldehyde (134 grams; 1 mol) and a solution of formaldehyde (75 grams; 2.5 mol) in water (250 ml.) are charged into a glass reaction flask equipped with stirrer and thermometer. The reaction mixture is stirred and sodium hydroxide (60 grams) dissolved in ethanol (150 ml.) is slowly added thereto. Upon completion of this addition the reaction mixture is heated on a steam bath for a period of about 4 hours. After this time the reaction mixture is distilled leaving a solid product. The product is recrystallized to yield the desired product 3-methyl-5-norbornene-2,2-dimethanol.

EXAMPLE 7

Preparation of 3-methyl-5,6,7,8,9,9-hexachloro-1,2,3,4,4a,5,8,8a-octahydro-1,4,5,8 - dimethanonaphthalene-2,2-dimethanol 3-methyl-5-norbornene-2,2-dimethanol (84 grams; 0.5 mol), hexachlorocyclopentadiene (136.5 grams; 0.5 mol) and toluene (300 ml.) are charged into a glass reaction vessel equipped with a mechanical stirrer, thermometer and reflux condenser. The reaction mixture is heated at reflux for a period of about 48 hours resulting in the formation of a precipitate. The precipitate is recovered by filtration, washed and recrystallized to yield the desired product 3-methyl-5,6,7,8,9,9-hexachloro-1,2,3,4,4a,5,8,8a-octahydro-1,4,5,8-dimethanonaphthalene-2,2-dimethanol.

Other compounds within the scope of the present invention can be prepared by the procedures described in the foregoing examples. Presented in the following examples are the essential ingredients required to prepare the indicated named compounds according to the procedures heretofore described.

EXAMPLE 8

Cyclopentadiene+acrolein+formaldehyde+hexafluorocyclopentadiene=5,6,7,8,9,9 - hexafluoro - 1,2,3,4,4a,5,8,8a - octahydro - 1,4,5,8 - dimethanonaphthalene - 2,2-dimethanol.

EXAMPLE 9

Cyclopentadiene+2 - pentenal+formaldehyde+hexachlorocyclopentadiene=3 - ethyl - 5,6,7,8,9,9 - hexachloro - 1,2,3,4,4a,5,8,8a - octahydro - 1,4,5,8 - dimethanonaphthalene-2,2-dimethanol.

EXAMPLE 10

Cyclopentadiene+2 - heptenal+formaldehyde+hexabromocyclopentadiene=3 - butyl - 5,6,7,8,9,9 - hexabromo - 1,2,3,4,4a,5,8,8a - octahydro - 1,4,5,8 - dimethanonaphthalene-2,2-dimethanol.

EXAMPLE 11

Cyclopentadiene+2 - decenal+formaldehyde+1,2,3,4-tetrachlorocyclopentadiene=3 - heptyl - 5,6,7,8 - tetrachloro - 1,2,3,4,4a,5,8,8a - octahydro - 1,4,5,8 - dimethanonaphthalene-2,2-dimethanol.

The new compounds of the present invention are useful for preparing a variety of synthetic resin compositions and are particularly useful for preparing polyesters exhibiting fire and flame retardant properties.

The compounds of the present invention can be reacted with saturated aliphatic and cycloaliphatic dicarboxylic acids and with aromatic dicarboxylic acids to form unreactive polyesters or they can be reacted with unsaturated dicarboxylic acids to form unsaturated polyesters which can be further crosslinked with a vinylic monomer to result in thermosetting compositions. In some instances the anhydride of the acid is preferably employed to prepare the polyester.

Exemplary suitable saturated aliphatic and cycloaliphatic dicarboxylic acids are oxalic acid, malonic acid, succinic acid, glutaric acid, adipic acid, pimelic acid, suberic acid, azelaic acid, sebacic acid, cyclohexane-1,4-dicarboxylic acid, cyclohexane - 1,3-dicarboxylic acid and cyclopentane-1,3-dicarboxylic acid. Suitable aromatic dicarboxylic acids or anhydrides are phthalic acid, isophthalic acid, terephthalic acid and phthalic anhydride. Exemplary suitable unsaturated dicarboxylic acids or anhydrides for preparing reactive polyesters are maleic acid, maleic anhydride, fumaric acid, citraconic acid, mesaconic acid, and the like.

The preparation of polyesters utilizing the compounds of the present invention can be carried out by the conventional techniques well known in the art such as the fusion cook or solvent methods. For example, the reactants can be combined with a quantity of an inert organic solvent such as toluene or xylene and heated to reflux. The water formed in the esterification reaction is thereby azeotroped with the inert solvent and is removed from the reaction site. The inert solvent remaining in the reaction mixture at or near the end of the reaction can be removed by heating, by application of vacuum or both to yield the desired polyester. Substantially equimolar amounts of the diols of the present invention and of the dicarboxylic acid are preferably employed to prepare the polyesters.

When the diols of the present invention are reacted with unsaturated dibasic acids to form reactive polyesters a hardenable polymerizable mixture can be prepared by incorporating at least one vinylic monomer in the polyester composition. Such a monomer will copolymerize by free radical addition polymerization with the unsaturation in the polyester to form hard thermosetting compositions. The amount of vinylic monomer that is employed to prepare these hardenable polymerizable mixtures can vary over a wide range, but a molar ratio of from about 1:5 to about 10:1 of vinylic monomer to reactive polyester is generally used.

Exemplary monomers which can be polymerized with the unsaturated polyesters described above are acrylic acid, methacrylic acid, methyl acrylate, methyl methacrylate, styrene, vinyl toluene, α-methyl styrene, acrylonitrile, vinyl acetate, vinyl benzoate, and the like. In general, it is preferred that the vinylic monomers contain a single vinyl group in a terminal position.

The crosslinking of the unsaturated polyesters with monomeric vinyl compounds is preferably carried out in the presence of free radical catalysts, such as the conventional peroxide or azo-type initiators, at a temperature suitable for the particular catalyst used.

The following examples illustrate the preparation of polyesters with the compounds of the present invention.

EXAMPLE 12

Preparation of a polyester from adipic acid and a glycol of the present invention 5,6,7,8,9,9 - hexachloro - 1,2,3,4,4a,5,8,8a - octahydro-1,4,5,8 - dimethanonaphthalene - 2,2 - dimethanol (10.7 grams; 0.025 mol) and adipic acid (3.7 grams; 0.025 mol) were placed into a glass reaction vessel and the mixture was heated in a bath of refluxing o-dichlorobenzene (179° C.) for a period of about two hours. The reaction mixture was kept under a nitrogen blanket by introducing the gas via a capillary tube under the surface of the reaction mixture. The resulting product was then cooled to room temperature to yield the desired polyester in the form of a hard solid cast.

EXAMPLE 13

Preparation of a polyester from maleic anhydride and a glycol of the present invention 5,6,7,8,9,9 - hexachloro - 1,2,3,4,4a,5,8,8a - octahydro-1,4,5,8 - dimethanonaphthalene - 2,2 - dimethanol (10.7 grams; 0.025 mol) was mixed with maleic anhydride (2.54 grams; 0.025 mol) and was placed in a glass reaction vessel. The reaction mixture was heated in a bath of refluxing o-dichlorobenzene (179° C.) for a period of about 2½ hours while maintaining a nitrogen blanket over the mixture. The mixture was then cooled to room temperature resulting in a solid cast of the desired unsaturated polyester.

EXAMPLE 14

Crosslinking of an unsaturated polyester with styrene

The unsaturated polyester prepared in Example 13 (3 grams) and styrene (2 grams) were placed in a glass reaction tube and were heated in a methanol bath until the polyester had dissolved in the styrene. A small amount of benzoyl peroxide was added to the solution. Heating was continued for a period of about 1½ hours resulting in a solid cast. The fire retardancy of this cast was determined and it was found that this sample did not support a flame.

The products of Examples 13 to 15 can be used for numerous applications wherein strong fire retardant castings or molded articles or protective fire retardant coatings are required.

I claim:

1. A compound of the formula

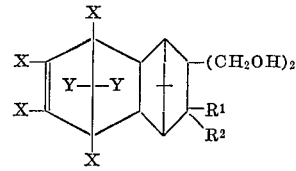

wherein X is selected from the group consisting of chlorine, fluorine and bromine; Y is selected from the group consisting of hydrogen, chlorine, fluorine and bromine; and $R^1$ and $R^2$ are each selected from the group consisting of hydrogen and alkyl having up to 6 carbon atoms.

2. A compound of claim 1, wherein $R^1$ and $R^2$ are hydrogen, and X and Y are selected from the group consisting of chlorine and bromine.

3. A compound of claim 1, wherein X and Y are chlorine.

4. A compound of claim 1, wherein X and Y are bromine.

5. The compound of claim 1, 5,6,7,8,9,9-hexachloro-1,2,3,4,4a,5,8,8a - octahydro - 1,4,5,8-dimethanonaphthalene-2,2-dimethanol and polyesters prepared therefrom.

6. The compound of claim 1, 5,6,7,8,9,9-hexabromo-1,2,3,4,4a,5,8,8a - octahydro - 1,4,5,8 - dimethanonaphthalene-2,2-dimethanol.

7. The compound of claim 1, 3-methyl-5,6,7,8,9,9-hexachloro-1,2,3,4,4a,5,8,8a-octahydro-1,4,5,8-dimethanonaphthalene-2,2-dimethanol.

References Cited

UNITED STATES PATENTS 3,136,694   6/1964   Muller _____ 260—617
2,881,196   4/1959   Kirby _____ 260—617

BERNARD HELFIN, Primary Examiner

M. W. GLYNN, Assistant Examiner

U.S. Cl. X.R.

260—75, 598, 860, 869

UNITED STATES PATENT OFFICE
CERTIFICATE OF CORRECTION

Patent No. 3,590,086         Dated June 29, 1971

Inventor(s) Jerome A. Gourse

It is certified that error appears in the above-identified patent and that said Letters Patent are hereby corrected as shown below:

In Claim 5, column 6, line 44, delete "and polyesters prepared therefrom."

Signed and sealed this 25th day of January 1972.

(SEAL)
Attest:

EDWARD M. FLETCHER, JR.          ROBERT GOTTSCHALK
Attesting Officer                    Commissioner of Patents